United States Patent

Grace et al.

[11] Patent Number: 5,968,646
[45] Date of Patent: *Oct. 19, 1999

[54] MOLECULAR GRAFTING OF HARDENER/GELATIN BLENDS TO ENERGETICALLY TREATED POLYESTERS TO PROMOTE ADHESION OF LAYERS

[75] Inventors: Jeremy M. Grace, Rochester; Louis J. Gerenser; Richard A. Castle, both of Webster; Janglin Chen, Rochester; Edgar E. Riecke, Pittsford, all of N.Y.

[73] Assignee: Eastman Kodak Company, Rochester, N.Y.

[ * ] Notice: This patent is subject to a terminal disclaimer.

[21] Appl. No.: 08/588,755

[22] Filed: Jan. 19, 1996

[51] Int. Cl.[6] .......................... B32R 27/08; B32R 27/18; B32R 27/34; B32R 27/36

[52] U.S. Cl. .................. 428/341; 428/480; 428/475.2; 428/478.2; 427/532; 427/533; 427/535; 427/536; 427/569; 427/301; 427/322; 427/372.2; 427/393.5; 427/414; 430/451; 430/523; 430/532; 430/533; 430/539; 430/640; 430/642; 430/954

[58] Field of Search .......................... 428/212, 219, 428/480, 474.4, 478.2, 475.2, 910, 340, 341; 427/532, 533, 535, 536, 569, 301, 322, 372.2, 393.5, 414; 430/451, 523, 531, 532, 533, 539, 640, 642, 937, 954

[56] References Cited

U.S. PATENT DOCUMENTS

| | | | |
|---|---|---|---|
| 4,171,976 | 10/1979 | Burness et al. | 96/111 |
| 4,241,169 | 12/1980 | Work, III et al. | 430/532 |
| 4,689,359 | 8/1987 | Ponticello et al. | 524/23 |
| 4,695,532 | 9/1987 | Ponticello et al. | 430/533 |
| 5,316,902 | 5/1994 | Specht et al. | 430/539 |
| 5,425,980 | 6/1995 | Grace et al. | 428/195 |
| 5,514,535 | 5/1996 | Hamilton et al. | 430/622 |
| 5,538,841 | 7/1996 | Grace et al. | 430/533 |
| 5,563,029 | 10/1996 | Grace et al. | 430/532 |
| 5,582,921 | 12/1996 | Grace et al. | 428/480 |

*Primary Examiner*—Vivian Chen
*Attorney, Agent, or Firm*—Arthur H. Rosenstein

[57] ABSTRACT

The present invention comprises a polyester film support in which the surface has been subjected to an energetic treatment with nitrogen plasma to produce amine groups on the polyester surface. The treated surface is then coated with a dilute solution of amine reactive hardener and gelatin. After drying the hardener/gelatin coated support a photographic emulsion is coated on the surface. The resulting film element has excellent adhesion of the photographic emulsion after photoprocessing, and it is safer to coat and handle than previously known methods involving grafting of hardener directly to the support.

11 Claims, 1 Drawing Sheet

MOLECULAR GRAFTING OF HARDENER/GELATIN BLENDS TO ENERGETICALLY TREATED POLYESTERS TO PROMOTE ADHESION OF LAYERS

FIELD OF THE INVENTION

The present invention relates to the manufacture of photosensitive materials. More specifically, the present invention relates to polyester material which has been subjected to energetic treatment with a mixture of hardener and gelatin grafted thereon.

BACKGROUND OF THE INVENTION

Conventional subbing chemistry has not proven totally effective on biaxially oriented polyester support, and thus, there is a problem of adhesion in the photoprocessor environment of aqueous coats of photographic emulsions to these highly inert polymer surfaces. Recent approaches to overcoming the challenges of subbing biaxially oriented polyester support have involved plasma treatments, UV treatments, and other surface modification techniques often combined with heating the support material and/or complicated subbing chemistry. Recent advances in subbing technology have shown promise for replacing a U-coat/gelatin sub system with a single subbing layer applied to a plasma treated biaxially oriented polyester support. This is described in more detail in U.S. Pat. No. 5,425,980 issued Jun. 20 1995 entitled, "Use of Glow Discharge Treatment to Promote Adhesion of Aqueous Coats to Substrate".

As described in U.S. Pat. No. 5,425,980, it has been shown that photographic emulsions may adhere to plasma treated support using gelatin sub and no U-coat, a single subbing layer containing a terpolymer and gelatin (as described in U.S. Pat. Nos. 4,695,532 and 4,689,359), or no subbing at all. The plasma treatment technology has enabled the coating of emulsions and gelatin based subbing layers directly onto biaxially oriented polyesters.

As described in U.S. Pat. No. 5,563,029, filed Apr. 3, 1995, there are some problems associated with mechanical strength and/or treatment process latitude for subbing layers coated directly onto energetically treated polyester support. In addition, subbing layers based on gelatin may exhibit sensitivity of adhesion to keeping conditions prior to adhesion testing. In U.S. Pat. No. 5,563,029 it is demonstrated that acceptable mechanical strength, wide treatment process latitude, and insensitivity of adhesion to keeping conditions can all be achieved by molecular grafting of amine reactive hardeners to an energetically treated surface of a biaxially oriented polyester support. Amine reactive hardeners and related compounds may present health and safety issues when coated as a separate layer. Thus, there is a need to provide a safe, simple, and effective process for achieving the results of good wet adhesion of emulsion to biaxially oriented polyester support.

U.S. Pat. No. 5,563,029 demonstrates the importance of having a sufficient amount of hardener at the energetically treated surface. The grafted hardener layer then links gelatin molecules (in the coated emulsion layer) to the treated surface. While this approach has been demonstrated by coating the hardener as a separate layer, it is not obvious that blending the hardener with gelatin in a single layer should be effective because of competition between hardener and gelatin for reaction sites at the treated support surface. On the other hand, coating the hardener and gelatin as a blend provides a safer coating operation and the resultant gelatin grafted support is safer to handle.

The difficulty with blending hardener and gelatin is well demonstrated by Work, III et al (U.S. Pat. No. 4,241,169 issued Dec. 23, 1980). Work, III et al find that gelatin/hardener blends do not produce good adhesion unless a water soluble polyester is added to the coating solution. The difficulty encountered by Work, III et al may arise from an inappropriate match of the surface chemistry of the treated support with the hardener employed.

The present invention provides a novel combination of gelatin and hardener blends and energetic treatment, applied to a polyester support. This combination is demonstrated for amine-reactive hardeners and results in good wet adhesion with desirable process improvements, namely, safer coating operation and a subbing formulation for which long-term storage and handling prior to emulsion coating is not a concern.

SUMMARY OF THE INVENTION

The present invention consists of a method of coating a polyester support which includes passing a surface of the polyester support through an energetic treatment. The surface of the polyester support is then coated with a combination of amine-reactive hardener and gelatin in solution. The hardener/gelatin coated support is then dried. The surface of the support is then coated with a photographic emulsion. The photographic emulsion can contain silver halide, or other photosensitive materials.

In a preferred embodiment of the present invention the hardener is selected from the following group of amine reactive hardeners: 1,2-bis(vinylsulfonylacetamido)ethane (BVSAE), bis(vinylsulfonyl)methane (BVSM), bis(vinylsulfonylmethyl)ether (BVSME) and bis(vinylsulfonylethyl)ether (BVSEE), 1,3-bis(vinylsulfonyl) propane (BVSP), 1,3-bis(vinylsulfonyl)-2-hydroxypropane (BVSHP), 1,1-bis(vinylsulfonyl)ethylbenzenesulfonate sodium salt, 1,1,1-tris(vinylsulfonyl)ethane (TVSE), tetrakis (vinylsulfonyl)methane, tris(acrylamido)hexahydro-s-triazine, copoly(acrolein-methacrylic acid), glycidyl ethers, acrylamides, dialdehydes, blocked dialdehydes, α-diketones, active esters, sulfonate esters, active halogen compounds, s-triazines, diazines, epoxides, formaldehydes, formaldehyde condensation products, anhydrides, aziridines, active olefins, blocked active olefins, mixed function hardeners such as halogen-substituted aldehyde acids, vinyl sulfones containing other hardening functional groups, polymeric hardeners such as polymeric aldehydes, polymeric vinylsulfones, polymeric blocked vinyl sulfones and polymeric active halogens.

Another embodiment of the present invention includes a film element which comprises a polyester support having a surface which has been exposed to an energetic treatment. A blend of hardener and gelatin, with the hardener selected from the group consisting of 1,2-bis (vinylsulfonylacetamido)ethane (BVSAE), bis (vinylsulfonyl)methane (BVSM), bis(vinylsulfonylmethyl) ether (BVSME) and bis(vinylsulfonylethyl)ether (BVSEE), 1,3-bis(vinylsulfonyl)propane (BVSP), 1,3-bis (vinylsulfonyl)-2-hydroxypropane (BVSHP), 1,1-bis (vinylsulfonyl)ethylbenzenesulfonate sodium salt, 1,1,1-tris (vinylsulfonyl)ethane (TVSE), tetrakis(vinylsulfonyl) methane, tris(acrylamido)hexahydro-s-triazine, copoly (acrolein-methacrylic acid), glycidyl ethers, acrylamides, dialdehydes, blocked dialdehydes, α-diketones, active esters, sulfonate esters, active halogen compounds, s-triazines, diazines, epoxides, formaldehydes, formaldehyde condensation products, anhydrides, aziridines, active olefins, blocked active olefins, mixed function hardeners such as halogen-substituted aldehyde acids, vinyl sulfones containing other hardening functional groups, polymeric hardeners such as polymeric aldehydes, polymeric vinylsulfones, polymeric blocked vinyl sulfones and polymeric active halogens is coated onto the treated support. Finally, a photographic emulsion is applied to the treated and coated surface of the polyester support.

Figure 1:
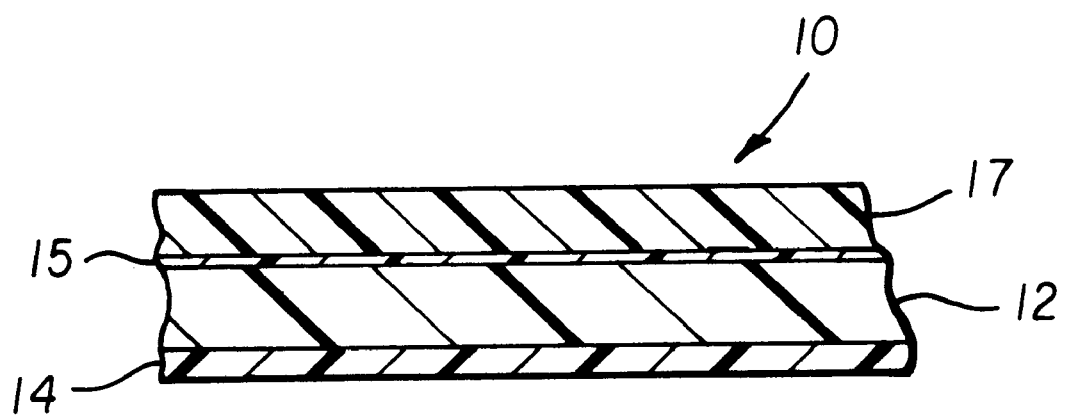
FIG. 1 shows a film element of the present invention.

For a better understanding of the present invention, together with other and further objects, advantages and capabilities thereof, reference is made to the following detailed description and appended claims in connection with the preceding drawings and description of some aspects of the invention.

DETAILED DESCRIPTION OF THE PREFERRED EMBODIMENTS

Traditional subbing technology represents an adhesive layer approach to solving an interfacial adhesion problem. In short, some layer or pair of layers is coated onto a polyester support, typically polyethylene naphthalate (PEN) or polyethylene terephthalate (PET), in order to create a surface to which the desired functional layers (e.g., photographic emulsions) will adhere. Generally, the interaction of the subbing layers with the polyester or functional layers can be rather complex, and success hinges on the ability of the aqueous subbing layer to penetrate the polyester surface. In contrast, by appropriately bonding hardener molecules directly to an energetically treated surface, it is possible to create a very thin layer that can interact readily with the coated photographic emulsion layer to produce excellent adhesion. Typical energetic treatment includes electrical discharge treatment, corona treatment and glow discharge treatment. U.S. Ser. No. 415,826 discloses an invention that includes exposing a polyester support to an energetic treatment that produces amine groups on the surface of the support, coating the treated support with a dilute solution of hardener and appropriate solvent (e.g. water, or organic solvent), and drying the coated support. The hardener coated polyester support is then ready for emulsion coating. The preferred hardeners include amine reactive hardeners (e.g., 1,2-bis(vinylsulfonylacetamido)ethane (BVSAE), bis (vinylsulfonyl)methane (BVSM), bis(vinylsulfonylmethyl) ether (BVSME) and bis(vinylsulfonylethyl)ether (BSEE), 1,3-bis(vinylsulfonyl)propane (BVSP), 1,3-bis (vinylsulfonyl)-2-hydroxypropane (BVSHP), 1,1-bis (vinylsulfonyl)ethylbenzenesulfonate sodium salt, 1,1,1-tris (vinylsulfonyl)ethane (TVSE), tetrakis(vinylsulfonyl) methane, tris(acrylamido)hexahydro-s-triazine, copoly (acrolein-methacrylic acid), glycidyl ethers, acrylamides, dialdehydes, blocked dialdehydes, α-diketones, active esters, sulfonate esters, active halogen compounds, s-triazines, diazines, epoxides, formaldehydes, formaldehyde condensation products, anhydrides, aziridines, active olefins, blocked active olefins, mixed function hardeners such as halogen-substituted aldehyde acids, vinyl sulfones containing other hardening functional groups, polymeric hardeners such as polymeric aldehydes, polymeric vinylsulfones, polymeric blocked vinyl sulfones and polymeric active halogens). Although the approach in U.S. Pat. No. 5,563,029 directly addresses the chemistry responsible for adhesion, it has some practical complications associated with coatability and safety in handling the coated support.

The present invention includes exposing a polyester support to an energetic treatment that produces amine groups on the surface of the polyester support, coating the treated polyester support with a blend of amine-reactive hardener and gelatin in solvent (e.g. water, or organic solvent), and drying the hardener/gelatin coated support. The gelatin grafted support is then ready for emulsion coating. The preferred hardeners include amine reactive hardeners (e.g., 1,2-bis(vinylsulfonylacetamido)ethane (BVSAE), bis (vinylsulfonyl)methane (BVSM), bis(vinylsulfonylmethyl) ether (BVSME) and bis(vinylsulfonylethyl)ether (BSEE), 1,3-bis(vinylsulfonyl)propane (BVSP), 1,3-bis (vinylsulfonyl)-2-hydroxypropane (BVSHP), 1,1,-bis (vinylsulfonyl)ethylbenzenesulfonate sodium salt, 1,1,1-tris (vinylsulfonyl)ethane (TVSE), tetrakis(vinylsulfonyl) methane, tris(acrylamido)hexahydro-s-triazine, copoly (acrolein-methacrylic acid), glycidyl ethers, acrylamides, dialdehydes, blocked dialdehydes, α-diketones, active esters, sulfonate esters, active halogen compounds, s-triazines, diazines, epoxides, formaldehydes, formaldehyde condensation products anhydrides, aziridines, active olefins, blocked active olefins, mixed function hardeners such as halogen-substituted aldehyde acids, vinyl sulfones containing other hardening functional groups, polymeric hardeners such as polymeric aldehydes, polymeric vinylsulfones, polymeric blocked vinyl sulfones and polymeric active halogens).

The examples discussed below are for plasma treated PEN coated with a dilute blend of bis(vinylsulfonyl)methane (BVSM) and gelatin and then coated with a representative photographic emulsion. The plasma treatments were done in a vacuum chamber equipped with a web drive. A controlled gas pressure was established in the electrode region of the chamber, and an AC high voltage was applied to the electrode. The polyester support was conveyed through the resulting plasma and was then wound onto a take-up spindle. The treated support was then removed from the chamber and was coated with a water/hardener/gelatin solution. The aqueous coated polyester support was then conveyed through a drying region and wound onto a take-up spindle. A representative photographic emulsion was then coated onto the plasma treated, hardener/gelatin coated polyester support.

Other methods of creating an amine functionalized surface comprise electrical discharge and/or UV irradiation in the presence of nitrogen gas or a nitrogen containing substance such as ammonia, methylamine, ethylamine, and the like.

FIG. 1 shows the film element 10 produced by the process of the present invention. The film element 10 includes a polyester support 12. The polyester support is typically PEN or PET. A backing layer 14 for a variety of functions such as magnetic recording, antistatic protection, lubricity, antiabrasion, antihalation and the like can be included on the backside of the support 12. On the topside of the support 12 is coated a gelatin grafted layer (hardener/gelatin blend) 15 subsequent to nitrogen plasma treatment of the support. A photographic emulsion layer 17 adheres to the hardener-containing layer 15. The present invention also includes the polyester support having a gelatin grafted layer formed from the reaction of hardener molecules with both the treated support and the gelatin.

For typical plasma conditions, pressures may be in the range of 0.02 to 2 Torr and plasma powers and web speeds may be set to deliver treatment doses from about 0.1 to 4.0 J/cm$^2$. In the examples presented below, the gas pressures ranged from 0.05 to 0.15 Torr; powers ranged from 150 to 600 watts, and the web speeds ranged from approximately 5.1 to 25.4 cm/s, yielding treatment doses in the range of 0.18 to 3.6 J/cm$^2$. For the solutions used to coat the gelatin grafted layer, hardener (BVSM) and gelatin concentrations ranged respectively from 0.0075 to 0.6% and 0.125 to 10% by weight. The hardener/gelatin solution was delivered at wet coverages ranging from 0.054 cc/dm$^2$ to 0.43 cc/dm$^2$, to obtain respective hardener and gelatin dry coverages in the range 0.032 to 0.32 mg/dm$^2$ and 0.538 to 5.38 mg/dm$^2$. Saponin was added at a level of 0.01% by weight of solution in all cases. Other surfactants such as sodium alkylarylpolyether sulfonate or p-isononylphenoxypoly(glycidol) and the like could be used as well. The coated polyester support was dried at 93° C. for 5 minutes as it passed through the coating apparatus.

The plasma treated hardener/gelatin coated polyester support was then coated with a representative photographic emulsion. The photographic emulsion was coated 18 days after the hardener/gelatin layer was coated. Samples were taken from this roll and incubated for 24 hours at 32° C. and 50% relative humidity (32/50). An additional set of samples was kept at 21° C. and 50% relative humidity for 10 days (21/50).

Both sets of samples were tested for wet adhesion in the presence of photoprocessing chemicals, using a wet abrasion test in Process C-41 (Kodak Flexicolor® developer). In this wet abrasion test, a rubber pad 3 cm in diameter is weighted with 900 grams and rubbed back and forth across a scribe line in the emulsion. The rubbing is done for 100 cycles in the presence of the developer solution.

The data in Table I provides examples of sensitivity to keeping conditions for runs made by coating the emulsion directly to the glow discharge treated polyester support as described in the prior art. In these comparative runs, the treatment gas was nitrogen, the pressure was 100 mTorr, and the web speed was 8.4 cm/s. In addition to the examples provided in Table I, there were runs made using other treatment powers and web speeds that showed even higher sensitivity to keeping conditions. In particular, coating on some treatment conditions exhibited 0–1% removal in the wet adhesion tests when tested after 10 days keeping at 21° C. and 50% relative humidity, but when the samples from the same coating events were incubated for 24 hours at 32° C. and 50% relative humidity prior to testing, they exhibited 99% removal in the wet adhesion test.

TABLE I

| Run | Plasma Power (Watts) | Wet Adhesion 32/50 Keeping (% Fail) | Wet Adhesion 21/50 Keeping (% Fail) |
| --- | --- | --- | --- |
| A1 | 60 | 17 | 0 |
| A2 | 330 | 20 | 0 |
| A3 | 600 | 34 | 0 |

In order to improve the performance (relative to Table I), hardener and gelatin blends were explored. Hardener (BVSM) and gelatin were dissolved in water and were then coated onto nitrogen plasma treated support and dried as described above. After 18 days, a representative photographic emulsion was coated on the gelatin grafted layer. Wet adhesion tests were then performed. The results are shown in Table II.

The plasma conditions listed in Table II are as follows. A: nitrogen plasma at a pressure of 0.150 Torr, a power of 150 watts, and a web speed of 25.4 cm/s; B: nitrogen plasma at a pressure of 0.1 Torr, a power of 150 watts, and a web speed of 8.5 cm/s; C: nitrogen plasma at a pressure of 0.05 Torr, a power of 600 watts, and a web speeds of 5 cm/s.

TABLE II

| Run | Plasma Conditions | BVSM/ Gelatin Ratio | Coated Solids (mg/dm$^2$) | Wet Adhesion 32/50 Keeping (% Fail) | Wet Adhesion 21/50 Keeping (% Fail) |
| --- | --- | --- | --- | --- | --- |
| B1 | A | 0.06 | 0.57 | 5.7 | 0 |
| B2 | A | 0.6 | 0.86 | 0 | 0 |
| B3 | A | 0.006 | 5.4 | 83.6 | 87.1 |
| B4 | A | 0.06 | 5.7 | 0 | 95.2 |
| B5 | B | 0.06 | 3.1 | 36.3 | 5.6 |
| B6 | C | 0.06 | 0.57 | 0 | 0 |
| B7 | C | 0.6 | 0.86 | 0 | 0 |
| B8 | C | 0.006 | 5.4 | 0 | 0 |
| B9 | C | 0.06 | 5.7 | 53.8 | 39.3 |

As can be seen from Table II, excellent wet adhesion is obtained for plasma conditions A and C, with low coverage of BVSM and gelatin, for a wide range of BVSM/gelatin ratio. Increased gelatin coverage results in poor wet adhesion performance. The treatment latitude for nitrogen plasma and BVSM is apparently wide. It should be noted that hardener/gelatin coatings with no plasma treatment result in extremely poor wet adhesion performance.

As seen from Table II, preferred conditions are obtained from combinations of hardener to gelatin ratio, coated solids, and plasma treatment conditions within the limits disclosed herein. It is preferred to use combinations including plasma conditions from 0.18 to 3.6 J/cm$^2$, hardener/gelatin ratios from 0.006 to 0.6 and coated solids from 0.57 to 5.7 mg/dm$^2$. For example note that run B8 exhibited excellent adhesion performance, despite the high gelatin coverage and the low BVSM/gelatin ratio. Apparently, the treatment conditions, hardener to gelatin ratio, and coverage are highly interactive to produce the desired adhesion. Although the above-described ranges are specifically shown in the Examples, the data suggests one skilled in the art can optimize these parameters over a larger range.

Although the present invention has been described in sufficient detail, it does not necessarily represent an optimized scenario. In particular, to produce a gelatin grafted layer, appropriate adjustment of surfactant level and treatment process may result in the desired adhesion for different hardener/gelatin ratios and coverages, although a substantially wide range has been demonstrated above.

The demonstrated gelatin grafted layers, using amine-reactive hardeners on nitrogen plasma treatments has substantial advantages over the molecular grafting of hardener as a separate step. As demonstrated with the molecular grafting of hardener, the hardener/gelatin graft technique employs specific and identifiable chemistries between hardener and treated polyester. The chemistry requires a simple surface modification (energetic treatment) and a simple coating (hardener solution or hardener and gelatin solution) to attain excellent adhesion. The hardener/gelatin graft yields a stable surface that is receptive to photographic emulsion and yet preserves the beneficial hardener-surface interactions between the hardener and plasma-treated support. In contrast to either the molecular grafted hardener or the hardener/gelatin graft, most conventional subbing chemistry requires a chemically complex subbing layer often followed by a second subbing layer prior to coating photographic emulsions. Furthermore, the success of the conventional subbing formulations generally involves coating unoriented polyester prior to biaxial orientation.

The approach described in this invention extends amine-based chemistries (disclosed in U.S. Pat. No. 5,563,029) to the use of hardener/gelatin blends which benefit from the molecular interaction between hardener and gelatin. The hardener/gelatin graft results in a passivated plasma treated polyester support that should be able to be stored indefinitely prior to emulsion coating with minimal safety concern about the hardener. It is expected that additional gelatin content can increase the handling safety of the hardener coated support. Furthermore the addition of gelatin to the hardener solution is expected to improve coatability and coating uniformity.

While there has been shown and described what are at present considered the preferred embodiments of the invention, it will be obvious to those skilled in the art that various alterations and modifications may be made therein without departing from the scope of the invention as defined by the appended claims. All such modifications are intended to be included in the present application.

We claim:

1. A method of coating a polyester support comprising:

passing a surface of the polyester support through an energetic treatment comprising nitrogen plasma to produce amine groups on the surface, said treatment conditions comprising providing a pressure of between 0.02 and 2 Torr; and providing a treatment dose at the surface between 0.1 and 4 J/cm$^2$;

coating the surface of the polyester support with a solution consisting essentially of an amine reactive hardener selected from the group consisting of 1,2-bis(vinylsulfonylacetamido)ethane, bis(vinylsulfonyl)methane, bis(vinylsulfonylmethyl)ether and bis(vinylsulfonylethyl)ether, 1,3-bis(vinylsulfonyl)propane, 1,3-bis(vinylsulfonyl)-2-hydroxypropane, 1,1-bis(vinylsulfonyl)ethylbenzenesulfonate sodium salt, 1,1,1-tris(vinylsulfonyl)ethane, tetrakis(vinylsulfonyl)methane, tris(acrylamido)hexahydro-s-triazine, copoly(acrolein-methacrylic acid), glycidyl ethers, acrylamides, dialdehydes, blocked dialdehydes, α-diketones, amine-reactive esters, sulfonate esters, amine-reactive halogenated polymers, s-triazines, diazines, epoxides, formaldehydes, formaldehyde condensation products, anhydrides, aziridines, amine-reactive olefins, blocked amine-reactive olefins, halogen-substituted aldehyde acids, polymeric hardeners, polymeric aldehydes, polymeric vinylsulfones and polymeric blocked vinyl sulfones wherein the ratio of hardener to gelatin in the range 0.006 to 0.6 by weight and wherein the total dry coverage of gelatin and hardener is in the range 0.5 to 6 mg/dm$^2$;

drying the hardener/gelatin coated support; and coating a photographic emulsion onto the hardener/gelatin coated support.

2. The method according to claim 1 wherein the hardener comprises bis(vinylsulfonylmethyl)ether.

3. The method according to claim 1 wherein the hardener comprises bis(vinylsulfonyl)methane.

4. The method according to claim 1 wherein the polyester support comprises polyethylene naphthalate.

5. The method according to claim 1 wherein the polyester support comprises polyethylene terephthalate.

6. A film element comprising:

a polyester substrate having a surface exposed to a nitrogen plasma treatment, the treatment conditions comprising providing a pressure of between 0.02 and 2 Torr; and providing a treatment dose at the surface between 0.1 and 4 J/cm$^2$;

producing amine groups on the surface;

a coating consisting essentially of an amine reactive hardener and gelatin wherein the amine reactive hardener is selected from the group consisting of 1,2-bis(vinylsulfonylacetamido)ethane, bis(vinylsulfonyl)methane, bis(vinylsulfonylmethyl)ether and bis(vinylsulfonylethyl)ether, 1,3-bis(vinylsulfonyl)propane, 1,3-bis(vinylsulfonyl)-2-hydroxypropane, 1,1-bis(vinylsulfonyl)ethylbenzenesulfonate sodium salt, 1,1,1-tris(vinylsulfonyl)ethane, tetrakis(vinylsulfonyl)methane, tris(acrylamido)hexahydro-s-triazine, copoly(acrolein-methacrylic acid), glycidyl ethers, acrylamides, dialdehydes, blocked dialdehydes, α-diketones, amine-reactive esters, sulfonate esters, amine-reactive halogenated polymers, s-triazines, diazines, epoxides, formaldehydes, formaldehyde condensation products, anhydrides, aziridines, amine-reactive olefins, blocked amine-reactive olefins, halogen-substituted aldehyde acids, polymeric hardeners, polymeric aldehydes, polymeric vinylsulfones and polymeric blocked vinyl sulfones; wherein the ratio of hardener to gelatin in the range 0.006 to 0.6 by weight and wherein the total dry coverage of gelatin and hardener is in the range 0.5 to 6 mg/dm$^2$ and a photographic emulsion applied to the coating of gelatin and hardener.

7. The film element according to claim 6 wherein the substrate comprises polyethylene nanphthalate.

8. The film element according to claim 6 wherein the substrate comprises polyethylene terephthalate.

9. A film base comprising:

a polyester substrate having a surface exposed to a nitrogen plasma treatment, the treatment conditions comprising providing a pressure of between 0.02 and 2 Torr; and providing a treatment dose at the surface between 0.1 and 4 J/cm$^2$; producing amine groups on the surface;

a coating of amine reactive hardener and gelatin, wherein the hardener is selected from the group consisting of 1,2-bis(vinylsulfonylacetamido)ethane, bis(vinylsulfonyl)methane, bis(vinylsulfonylmethyl)ether and bis(vinylsulfonylethyl)ether, 1,3-bis(vinylsulfonyl)propane, 1,3-bis(vinylsulfonyl-2-hydroxypropane, 1,1-tris(vinylsulfonyl)ethane, tetrakis(vinylsulfonyl)methane, tris(acrylamido)hexahydro-s-triazine, copoly(acrolein-methacrylic acid), glycidyl ethers, acrylamides, dialdehydes, blocked dialdehydes, α-diketones, amine-reactive esters, sulfonate esters, amine-reactive halogenated polymers, s-triazines, diazines, epoxides, formaldehydes, formaldehyde condensation products, anhydrides, aziridines, amine-reactive olefins, blocked amine-reactive olefins, halogen-substituted aldehyde acids, polymeric hardeners, polymeric aldehydes, polymeric vinylsulfones and polymeric blocked vinyl sulfones, wherein the ratio of hardener to gelatin is in the range 0.006 to 0.6 by weight and wherein the total dry coverage of gelatin and hardener ids in the range 0.5 to 6 mg/dm$^2$.

10. The film base according to claim 9 wherein the substrate comprises polyethylene naphthalate.

11. The film base according to claim 9 wherein the substrate comprises polyethylene terephthalate.

* * * * *